(12) United States Patent  (10) Patent No.: US 7,435,029 B1
Marini  (45) Date of Patent: Oct. 14, 2008

(54) LIQUID APPLICATION SYSTEM

(76) Inventor: Thomas R. Marini, 106 W. Fork, Dixon, IL (US) 61021

( * ) Notice: Subject to any disclaimer, the term of this patent is extended or adjusted under 35 U.S.C. 154(b) by 0 days.

(21) Appl. No.: 11/563,098

(22) Filed: Nov. 24, 2006

(51) Int. Cl.
B05C 17/00 (2006.01)
B43M 11/02 (2006.01)
A46B 11/02 (2006.01)

(52) U.S. Cl. .................... 401/197; 401/188 R; 401/217
(58) Field of Classification Search .................. 401/197, 401/219, 208, 188 R, 190, 6
See application file for complete search history.

(56) References Cited

U.S. PATENT DOCUMENTS

| | | | |
|---|---|---|---|
| 673,960 A * | 5/1901 | Looker ........................ 401/197 |
| 1,256,828 A | 2/1918 | Perry |
| 1,921,901 A * | 8/1933 | Anderson ............. 126/271.2 C |
| 2,329,917 A * | 9/1943 | Lautmann .................... 222/209 |
| 2,787,249 A * | 4/1957 | Barlow et al. ................ 401/184 |
| 2,800,673 A * | 7/1957 | Lazisky .................. 401/188 R |
| 3,545,875 A * | 12/1970 | Helmut ....................... 401/197 |
| 3,651,600 A * | 3/1972 | Ewing ............................ 47/1.5 |
| 3,919,979 A | 11/1975 | Keene |
| 4,802,576 A | 2/1989 | Kern |
| D385,060 S | 10/1997 | Burrell et al. |
| 5,845,659 A | 12/1998 | Hutchins |
| 2005/0207821 A1 | 9/2005 | Bergey et al. |

* cited by examiner

Primary Examiner—David J Walczak

(57) ABSTRACT

A liquid application system for applying an insect repellent to skin of an animal or a person includes a tube receiving a liquid to be applied to skin. The tube is graspable to facilitate manipulation of the system. A yoke is coupled to a first end of the tube. The yoke is in fluid communication with the tube. The yoke includes a pair of spaced ends. A roller assembly is rotatably coupled to the spaced ends of the yoke. The roller assembly is in fluid communication with the yoke. The roller assembly receives the liquid from the yoke and is rolled along the skin to apply the liquid to the skin.

12 Claims, 6 Drawing Sheets

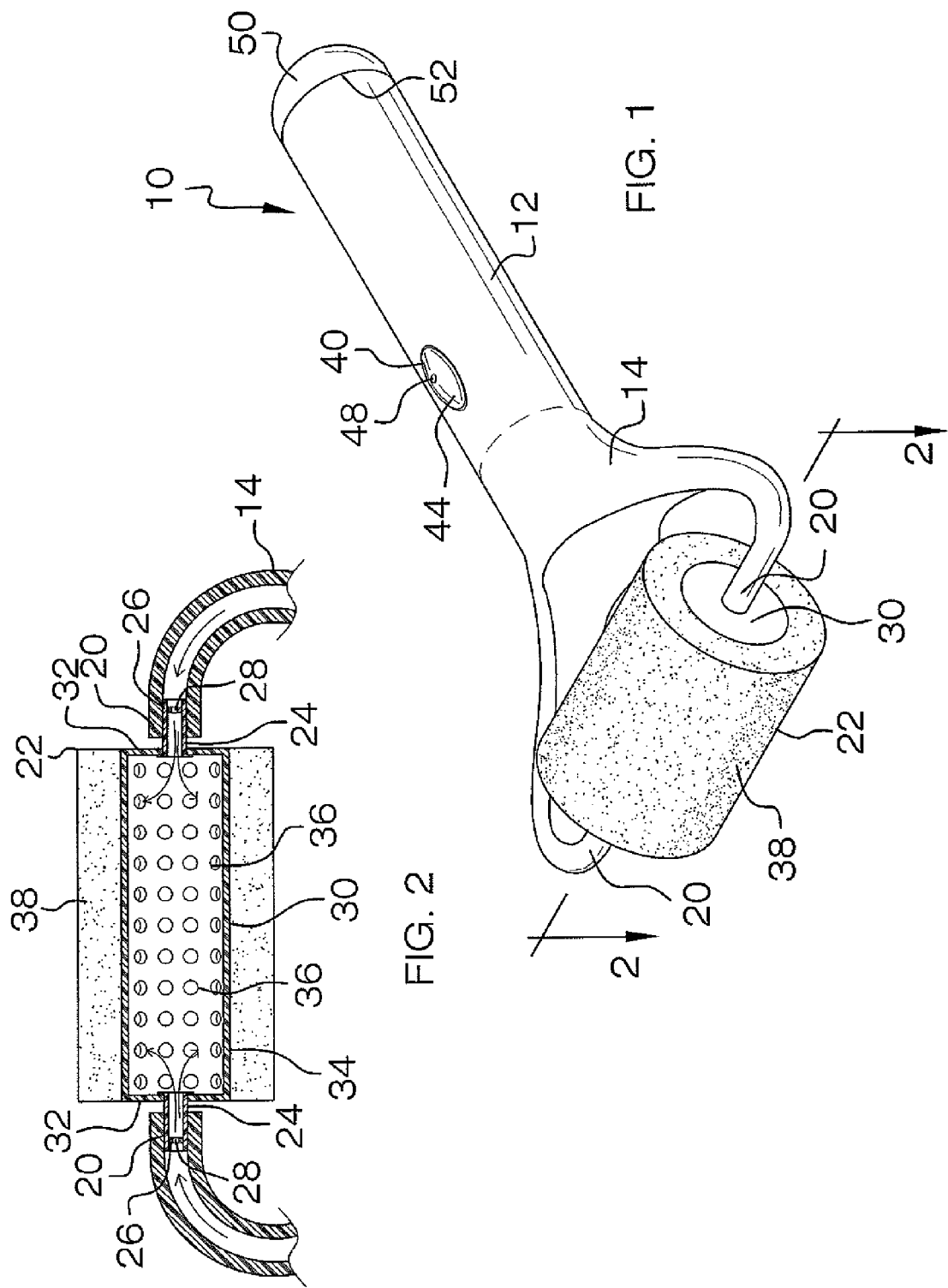

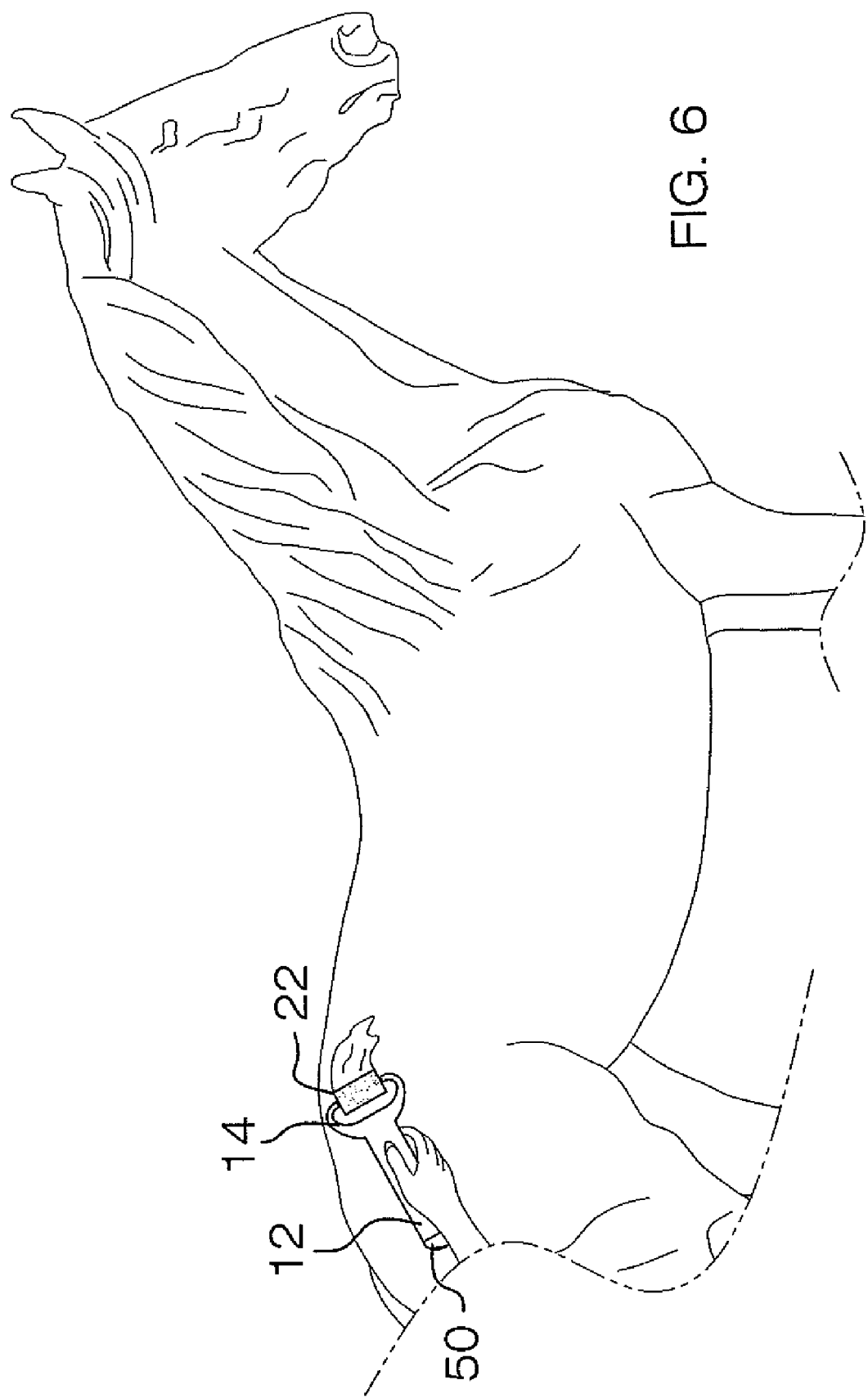

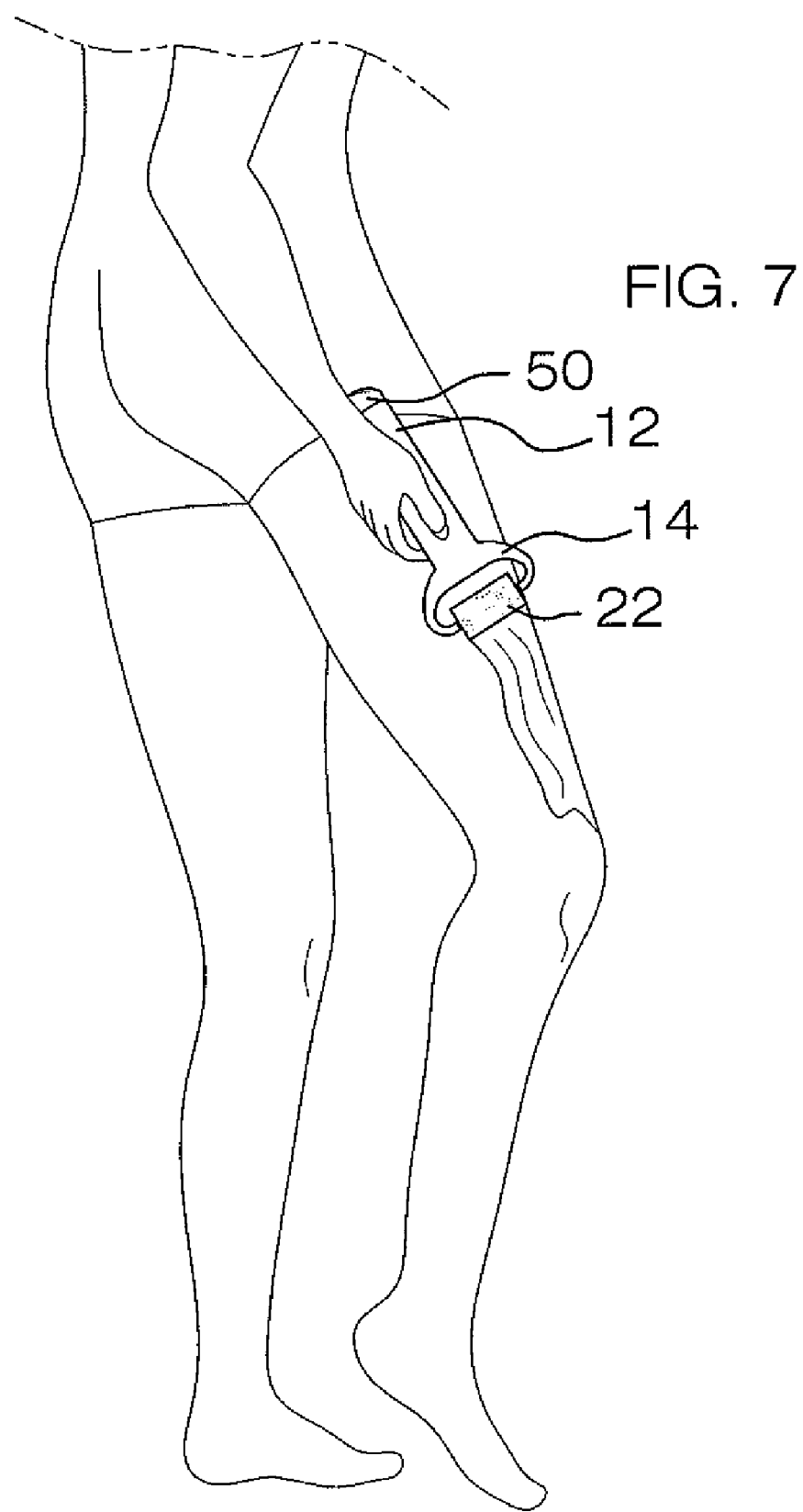

LIQUID APPLICATION SYSTEM

BACKGROUND OF THE INVENTION

1. Field of the Invention

The present invention relates to liquid applicators and more particularly pertains to a new liquid applicator for applying an insect repellent to skin of an animal or a person.

2. Description of the Prior Art

The use of liquid applicators is known in the prior art. While these devices fulfill their respective, particular objectives and requirements, the need remains for a system that has certain improved features that allows for a desired liquid to be placed in the system to be applied to the skin. Additionally, the system will conform to contours of the skin to provide a more thorough coverage of the liquid on the skin.

SUMMARY OF THE INVENTION

The present invention meets the needs presented above by generally comprising a tube receiving a liquid to be applied to skin. The tube is graspable to facilitate manipulation of the system. A yoke is coupled to a first end of the tube. The yoke is in fluid communication with the tube. The yoke includes a pair of spaced ends. A roller assembly is rotatably coupled to the spaced ends of the yoke. The roller assembly is in fluid communication with the yoke. The roller assembly receives the liquid from the yoke and is rolled along the skin to apply the liquid to the skin.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a liquid application system according to the present invention.

FIG. 2 is a cross-sectional view of the present invention taken along line 2-2 of FIG. 1.

FIG. 6 is a side view of the present invention shown in use to apply the liquid to an animal.

FIG. 7 is a side view of the present invention shown in use to apply the liquid to a person.

DESCRIPTION OF THE PREFERRED EMBODIMENT

Figure 3:
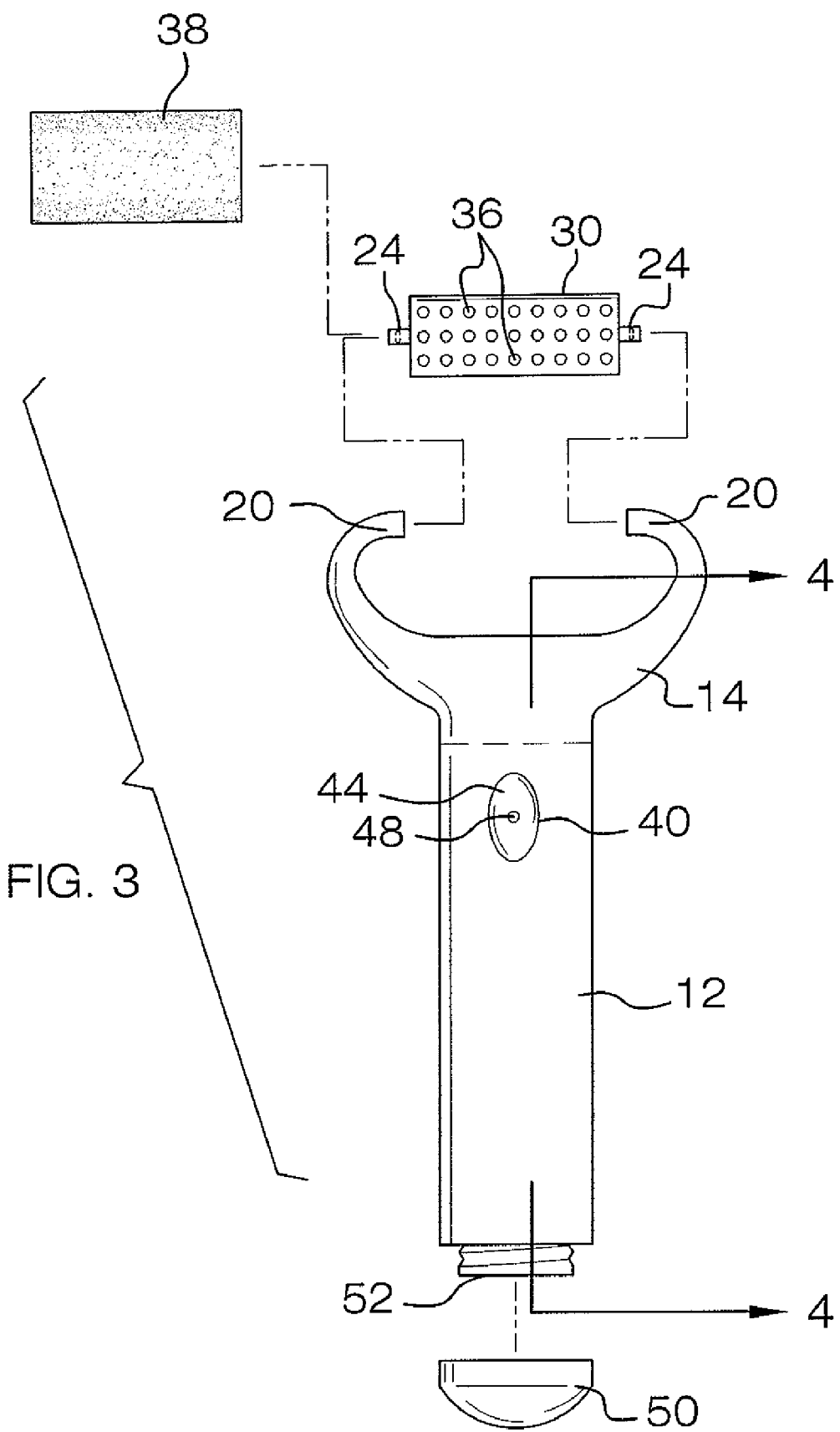
FIG. 3 is an exploded top view of the present invention.
Figure 4:
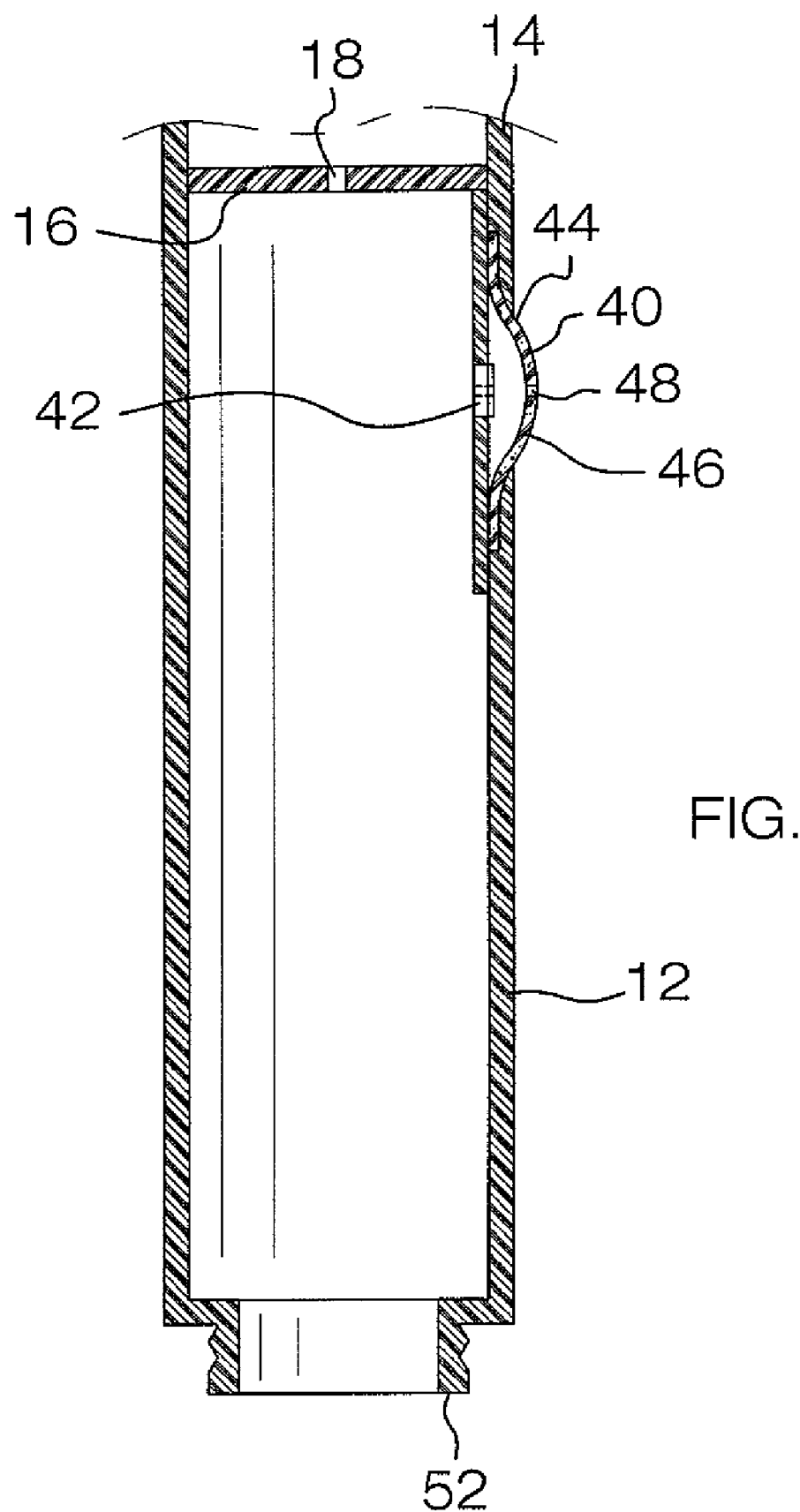
FIG. 4 is a cross-sectional view of the present invention taken along line 4-4 of FIG. 3.
Figure 5:
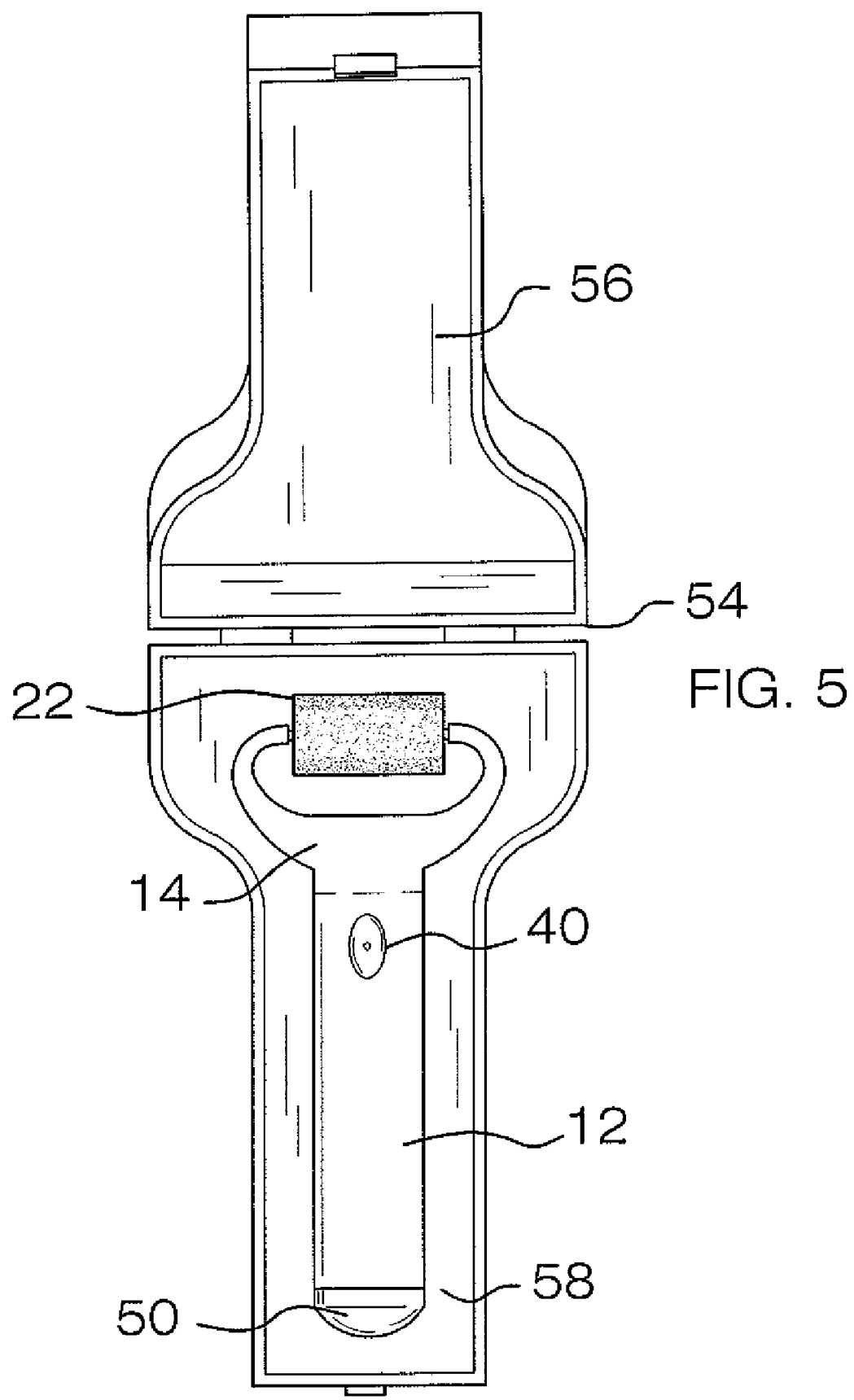
FIG. 5 is a top view of an embodiment of the present invention including a case.

With reference now to the drawings, and in particular to FIGS. 1 through 7 thereof, a new liquid applicator embodying the principles and concepts of the present invention and generally designated by the reference numeral 10 will be described.

As best illustrated in FIGS. 1 through 7, the liquid application system 10 generally comprises a tube 12 receiving a liquid to be applied to skin. The tube 12 is graspable to facilitate manipulation of the system. A yoke 14 is coupled to a first end 16 of the tube 12. The first end 16 of the tube 12 has a hole 18 therethrough to permit fluid communication between the yoke 14 and the tube 12. The yoke 14 includes a pair of spaced ends 20. The spaced ends 20 are axially aligned with each other.

A roller assembly 22 is rotatably coupled to the spaced ends 20 of the yoke 14. The roller assembly 22 is axially aligned with the spaced ends 20. The roller assembly 22 is in fluid communication with the yoke 14. The roller assembly 22 receives the liquid from the yoke 14 and is rolled along the skin to apply the liquid to the skin.

The roller assembly 22 includes a pair of axle conduits 24. Each of the spaced ends 20 of the yoke 14 has one of the axle conduits 24 slidably inserted therein, wherein each of the axle conduits 24 is rotatable in the associated one of spaced ends 20. Each of the axle conduits 24 is in fluid communication with the associated one of the spaced ends 20. Each of the axle conduits 24 has one of a pair of washers 26 positioned therein. Each of the washers 26 has a reducing orifice 28 extending therethrough. The reducing orifice 28 increases a speed of the liquid passing through the associated one of the axle conduits 24.

The roller assembly 22 also includes a distribution cylinder 30 coupled to the axle conduits 24, wherein the distribution cylinder 30 is axially aligned with the axle conduits 24 and the spaced ends 20. The distribution cylinder 30 includes a pair of end walls 32 and a peripheral wall 34 extending between the end walls 32. Each of the end walls 32 has one of the axle conduits 24 coupled thereto. The peripheral wall 34 has a plurality of distribution apertures 36 extending therethrough. The distribution cylinder 30 is in fluid communication with the axle conduits 24, wherein the distribution apertures 36 permit the liquid received by the distribution cylinder 30 to exit the distribution cylinder 30.

The roller assembly 22 additionally includes an application sleeve 38 mounted to and covering the peripheral wall 34 of the distribution cylinder 30. The application sleeve 38 receives the liquid from the distribution cylinder 30. The application sleeve 38 comprises a resiliently compressible and liquid permeable material to conform to the skin and apply the liquid to the skin when the application sleeve 38 is rolled over the skin.

A pump assembly 40 is coupled to the tube 12. The pump assembly 40 is actuated to force the liquid from the tube 12 into the yoke 14. The pump assembly 40 includes a one-way valve 42 coupled to the tube 12 and in fluid communication with the tube 12. The one-way valve 42 permits fluid to enter into the tube 12 while inhibiting the liquid in the tube 12 from passing through the one-way valve 42 and out of the tube 12.

The pump assembly 40 also includes a button 44 coupled to the tube 12 and outwardly extending over the one-way valve 42. A bulbous portion 46 of the button 44 is positioned over the one-way valve 42. The bulbous portion 46 forces air positioned between the bulbous portion 46 and the one-way valve 42 through the one-way valve 42 and into the tube 12 to force the liquid through the hole 18 in the first end 16 when the button 44 is depressed. The button 44 has an intake aperture 48. The intake aperture 48 permits air to enter the area between the bulbous portion 46 and the one-way valve 42 when the button 44 is released and returns to a convex shape.

A cap 50 is mountable to a second end 52 of the tube 12. The cap 50 closes the second end 52 to retain the liquid in the tube 12 when the cap 50 is mounted to the second end 52. A case 54 receives the tube 12, the yoke 14 and the roller assembly 22 for storage when not in use. The case 54 includes a first clamshell portion 56 hingedly coupled to a second clamshell portion 58. The second clamshell portion 58 receives the tube 12, the yoke 14 and the roller assembly 22. The first clamshell portion 56 is pivoted over the second clamshell portion 58 to encase the tube 12, the yoke 14 and the roller assembly 22 in the case 54.

In use, the cap 50 is removed from the tube 12 and the liquid, such as insect repellent, is poured into the tube 12. The cap 50 is then replaced and the button 44 depressed to force air into through the one-way valve 42 and into the tube 12 to force the liquid into the yoke 14. The liquid enters the yoke 14 and is transferred into the distribution cylinder 30 and then through the distribution apertures 36 to the application sleeve 38. The application sleeve 38 is rolled across the skin to apply the liquid to the skin.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An application system comprising:
   a tube for holding a liquid to be applied to skin, said tube being graspable to facilitate manipulation of the system;
   a yoke being coupled to a first end of said tube, said yoke being in fluid communication with said tube, said yoke including a pair of spaced ends;
   a roller assembly being rotatably coupled to said spaced ends of said yoke, said roller assembly being in fluid communication with said yoke, said roller assembly adapted for receiving the liquid from said yoke and being rolled along the skin to apply the liquid to the skin, said roller assembly includes a pair of axle conduits, each of said spaced ends of said yoke having one of said axle conduits slidably inserted therein, wherein each of said axle conduits is rotatable in the associated one of spaced ends, each of said axle conduits being in fluid communication with the associated one of said spaced ends, said roller assembly including a pair of washers, each of said axle conduits having one of said washers positioned therein, each of said washers having a reducing orifice extending therethrough, said reducing orifice increasing a speed of the liquid passing through the associated one of said axle conduits;
   a pump assembly being mounted on said tube, said pump assembly being actuated to force the liquid from said tube into said yoke, said pump assembly comprising;
      a one-way valve being mounted in a perimeter wall of said tube and in fluid communication with said tube, said one-way valve adapted for permitting fluid to enter into said tube while inhibiting the liquid in said tube from passing through said one-way valve and out of said tube; and
      a button being mounted on said perimeter wall of said tube and outwardly extending over said one-way valve, a bulbous portion of said button being positioned over said one-way valve, said bulbous portion forcing air positioned between said bulbous portion and said one-way valve through said one-way valve and into said tube to force the liquid through a hole in said first end when said button is depressed, said button having an intake aperture, said intake aperture permitting air to enter the area between said bulbous portion and said one-way valve when said button is released, said intake aperture being covered when said button is actuated to force air trapped within said button through said one-way valve and into said tube.

2. The system according to claim 1, wherein said first end of said tube has a hole therethrough to permit fluid communication between said yoke and said tube.

3. The system according to claim 1, wherein said spaced ends being axially aligned with each other, said roller assembly being axially aligned with said spaced ends.

4. The system according to claim 1, wherein said roller assembly includes a distribution cylinder being coupled to said axle conduits, wherein said distribution cylinder is axially aligned with said axle conduits.

5. The system according to claim 4, wherein said distribution cylinder includes a pair of end walls and a peripheral wall extending between said end walls, each of said end walls having one of said axle conduits coupled thereto.

6. The system according to claim 5, wherein said peripheral wall has a plurality of distribution apertures extending therethrough, said distribution cylinder being in fluid communication with said axle conduits, wherein said distribution apertures permit the liquid received by said distribution cylinder to exit said distribution cylinder.

7. The system according to claim 6, wherein said roller assembly includes an application sleeve being mounted to and covering said peripheral wall of said distribution cylinder, said application sleeve receiving the liquid from said distribution cylinder.

8. The system according to claim 7, wherein said application sleeve comprises a resiliently compressible and liquid permeable material to conform to the skin and apply the liquid to the skin when said application sleeve is rolled over the skin.

9. The system according to claim 1, wherein a cap is mountable to a second end of said tube, said cap closing said second end to retain the liquid in said tube when said cap is mounted to said second end.

10. The system according to claim 1, further including a case receiving said tube, said yoke and said roller assembly for storage when not in use.

11. The system according to claim 10, wherein said case includes a first clamshell portion hingedly coupled to a second clamshell portion, said second clamshell portion receiving said tube, said yoke and said roller assembly, said first clamshell portion being pivoted over said second clamshell portion to encase said tube, said yoke and said roller assembly in said case.

12. An application system comprising:
   a tube for holding a liquid to be applied to skin, said tube being graspable to facilitate manipulation of the system;
   a yoke being coupled to a first end of said tube, said first end of said tube having a hole therethrough to permit fluid communication between said yoke and said tube, said yoke including a pair of spaced ends, said spaced ends being axially aligned with each other;

a roller assembly being rotatably coupled to said spaced ends of said yoke, said roller assembly being axially aligned with said spaced ends, said roller assembly being in fluid communication with said yoke, said roller assembly adapted for receiving the liquid from said yoke and being rolled along the skin to apply the liquid to the skin, said roller assembly comprising;

a pair of axle conduits, each of said spaced ends of said yoke having one of said axle conduits slidably inserted therein, wherein each of said axle conduits is rotatable in the associated one of spaced ends, each of said axle conduits being in fluid communication with the associated one of said spaced ends;

a pair of washers, each of said axle conduits having one of said washers positioned therein, each of said washers having a reducing orifice extending therethrough, said reducing orifice increasing a speed of the liquid passing through the associated one of said axle conduits;

a distribution cylinder being coupled to said axle conduits, wherein said distribution cylinder is axially aligned with said axle conduits and said spaced ends, said distribution cylinder including a pair of end walls and a peripheral wall extending between said end walls, each of said end walls having one of said axle conduits coupled thereto, said peripheral wall having a plurality of distribution apertures extending therethrough, said distribution cylinder being in fluid communication with said axle conduits, wherein said distribution apertures permit the liquid received by said distribution cylinder to exit said distribution cylinder;

an application sleeve being mounted to and covering said peripheral wall of said distribution cylinder, said application sleeve receiving the liquid from said distribution cylinder, said application sleeve comprising a resiliently compressible and liquid permeable material to conform to the skin and apply the liquid to the skin when said application sleeve is rolled over the skin;

a pump assembly being mounted on and coupled to said tube, said pump assembly being actuated to force the liquid from said tube into said yoke, said pump assembly comprising;

a one-way valve being mounted in a perimeter wall of said tube and in fluid communication with said tube, said one-way valve permitting fluid to enter into said tube while inhibiting the liquid in said tube from passing through said one-way valve and out of said tube;

a button being mounted on said perimeter wall of said tube and outwardly extending over said one-way valve, a bulbous portion of said button being positioned over said one-way valve, said bulbous portion forcing air positioned between said bulbous portion and said one-way valve through said one-way valve and into said tube to force the liquid through said hole in said first end when said button is depressed, said button having an intake aperture, said intake aperture permitting air to enter the area between said bulbous portion and said one-way valve when said button is released, said intake aperture being covered when said button is actuated to force air trapped within said button through said one-way valve and into said tube; and a cap being mountable to a second end of said tube, said cap closing said second end to retain the liquid in said tube when said cap is mounted to said second end.

* * * * *